(«12») United States Patent
Tamaki et al.

(10) Patent No.: US 10,374,223 B2
(45) Date of Patent: Aug. 6, 2019

(54) POSITIVE ELECTRODE ACTIVE MATERIAL/GRAPHENE COMPOSITE PARTICLES, POSITIVE ELECTRODE MATERIAL FOR LITHIUM ION CELL, AND METHOD FOR MANUFACTURING POSITIVE ELECTRODE ACTIVE MATERIAL/GRAPHENE COMPOSITE PARTICLES

(71) Applicant: TORAY INDUSTRIES, INC., Tokyo (JP)

(72) Inventors: Eiichiro Tamaki, Otsu (JP); Yasuo Kubota, Otsu (JP); Hiroaki Kawamura, Otsu (JP); Hanxiao Yang, Otsu (JP); Mayumi Hara, Okazaki (JP)

(73) Assignee: TORAY INDUSTRIES, INC., Tokyo (JP)

( * ) Notice: Subject to any disclaimer, the term of this patent is extended or adjusted under 35 U.S.C. 154(b) by 575 days.

(21) Appl. No.: 14/653,755

(22) PCT Filed: Jan. 20, 2014

(86) PCT No.: PCT/JP2014/050913
§ 371 (c)(1),
(2) Date: Jun. 18, 2015

(87) PCT Pub. No.: WO2014/115669
PCT Pub. Date: Jul. 31, 2014

(65) Prior Publication Data
US 2015/0333320 A1    Nov. 19, 2015

(30) Foreign Application Priority Data

Jan. 23, 2013 (JP) ................................. 2013-009840
May 23, 2013 (JP) ................................. 2013-108544

(51) Int. Cl.
*H01M 4/131* (2010.01)
*H01M 4/36* (2006.01)
(Continued)

(52) U.S. Cl.
CPC ........... *H01M 4/364* (2013.01); *H01M 4/131* (2013.01); *H01M 4/133* (2013.01); *H01M 4/366* (2013.01);
(Continued)

(58) Field of Classification Search
None
See application file for complete search history.

(56) References Cited

U.S. PATENT DOCUMENTS 9,831,501 B2 *   11/2017   Kang ................... H01M 4/133
2011/0052813 A1 *   3/2011   Ho ......................... B82Y 30/00
                                                        427/256

(Continued)

FOREIGN PATENT DOCUMENTS

CN     102148371 A    8/2011
EP     2607319 A1     6/2013
(Continued)

OTHER PUBLICATIONS

Japanese Third-Party Submissions, dated Jan. 30, 2017, for Japanese Application No. 2014-529353.
(Continued)

*Primary Examiner* — Tracy M Dove
(74) *Attorney, Agent, or Firm* — Birch, Stewart, Kolasch & Birch LLP

(57) ABSTRACT

A conventional positive electrode material for lithium ion batteries that is made of positive electrode active material/graphene composite particles has low graphene material ion conductivity and is incapable of providing favorable battery performance. In the present invention, positive electrode
(Continued)

active material/graphene composite particles are conferred with high electron conductivity and ion conductivity by formation of an appropriately functionalized graphene/positive electrode active material composite, and are capable of yielding a high-capacity/high-output lithium ion secondary battery when used as a positive electrode active material for a lithium ion battery.

9 Claims, 1 Drawing Sheet

(51) Int. Cl.
  *H01M 4/133* (2010.01)
  *H01M 4/485* (2010.01)
  *H01M 4/62* (2006.01)
  *H01M 4/58* (2010.01)
  *H01M 4/505* (2010.01)
  *H01M 4/525* (2010.01)
  *H01M 4/587* (2010.01)
  *H01M 4/02* (2006.01)
  *H01M 10/0525* (2010.01)

(52) U.S. Cl.
  CPC .......... *H01M 4/485* (2013.01); *H01M 4/505* (2013.01); *H01M 4/525* (2013.01); *H01M 4/587* (2013.01); *H01M 4/5825* (2013.01); *H01M 4/625* (2013.01); *H01M 10/0525* (2013.01); *H01M 2004/021* (2013.01); *H01M 2004/028* (2013.01)

(56) References Cited

U.S. PATENT DOCUMENTS

| 2012/0058397 A1 | 3/2012 | Zhamu et al. |
| 2012/0088151 A1 | 4/2012 | Yamazaki et al. |
| 2012/0088156 A1 | 4/2012 | Nomoto et al. |
| 2012/0104327 A1 | 5/2012 | Kim et al. |
| 2012/0315550 A1 | 12/2012 | Liu et al. |
| 2012/0328951 A1 | 12/2012 | Hirohashi et al. |
| 2013/0157135 A1 | 6/2013 | Zhou et al. |

FOREIGN PATENT DOCUMENTS

| EP | 2747175 A1 | 6/2014 | |
| JP | 2012-99468 A | 5/2012 | |
| JP | 2013-212975 A | 10/2013 | |
| KR | 20130084771 A | * | 7/2013 |
| WO | WO 2011/079238 A1 | 6/2011 | |
| WO | WO 2011/141486 A1 | 11/2011 | |
| WO | WO 2012/031401 A1 | 3/2012 | |
| WO | WO 2012/075960 A1 | 6/2012 | |

OTHER PUBLICATIONS

Popovic et al., "LiFePO$_4$ Mesocrystals for Lithium-Ion Batteries," Small, vol. 7, No. 8, 2011, pp. 1127-1135.
Sides et al. "A High-Rate, Nanocomposite LiFePO$_4$/Carbon Cathode," Electrochemical and Solid-State Letters, vol. 8, No. 9, 2005 (Available Electronically Jul. 29, 2005), pp. A484-A487.
International Search Report issued in PCT/JP2014/050913, dated Apr. 15, 2014.
Extended European Search Report, dated Aug. 31, 2016, for European Application No. 14743943.4.
Communication pursuant to Article 94(3) EPC, dated Jan. 24, 2018, for European Application No. 14 743 943.4.

* cited by examiner

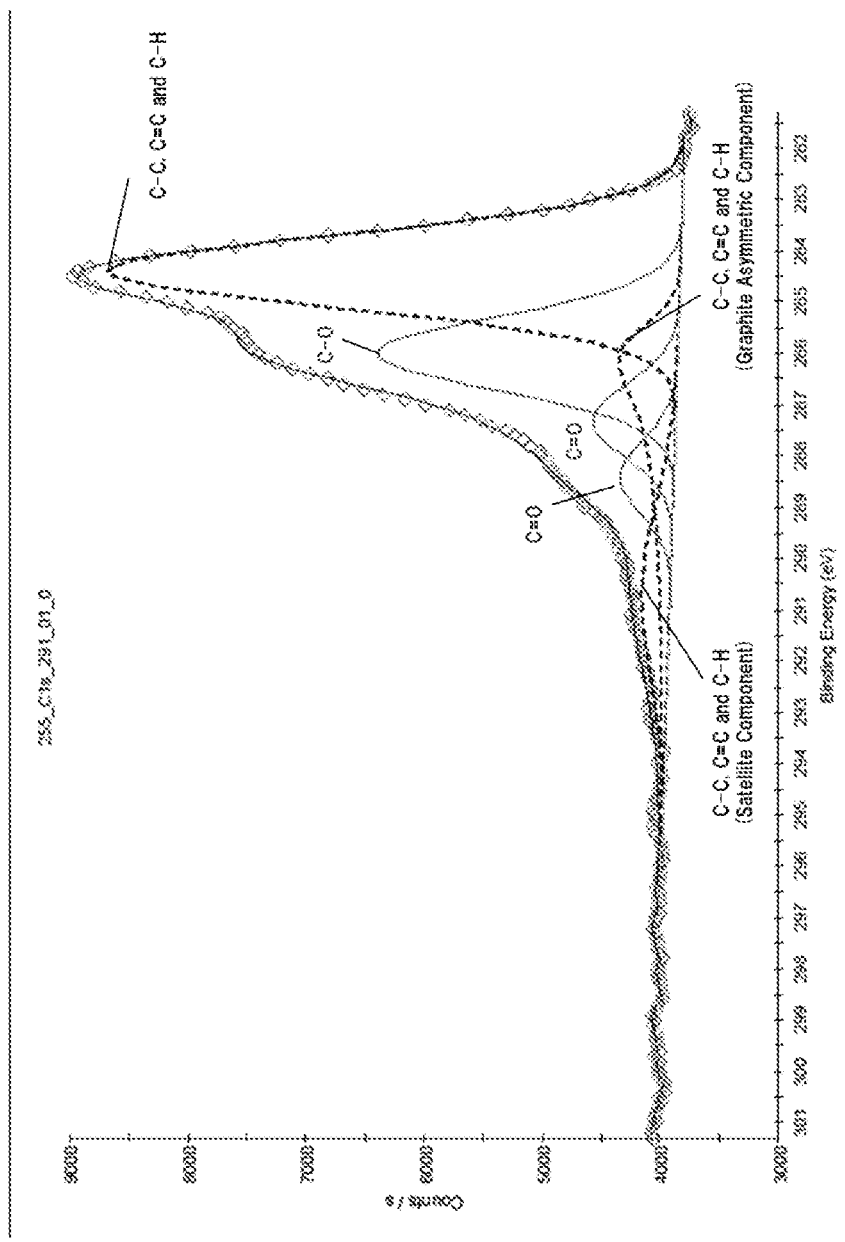

POSITIVE ELECTRODE ACTIVE MATERIAL/GRAPHENE COMPOSITE PARTICLES, POSITIVE ELECTRODE MATERIAL FOR LITHIUM ION CELL, AND METHOD FOR MANUFACTURING POSITIVE ELECTRODE ACTIVE MATERIAL/GRAPHENE COMPOSITE PARTICLES

TECHNICAL FIELD

The present invention relates to a positive electrode active material/graphene composite particles formed by formation of graphene/positive electrode active material for a lithium ion battery composite, and a positive electrode material for a lithium ion battery composed of the positive electrode active material/graphene composite particles.

BACKGROUND ART

A lithium ion secondary battery has been widely used for information-related mobile communication electronic equipment such as mobile phones and laptop personal computers since it enables the battery to become smaller in size and lighter in weight as a battery capable of attaining higher voltage and higher energy density compared to the conventional nickel-cadmium battery and nickel metal hydride battery. With regard to the lithium ion secondary battery, it is thought that the opportunity of being utilized for onboard use in which the battery is incorporated into electric vehicles, hybrid electric vehicles and the like as a means for solving an environmental problem or industrial use such as electric power tools will further increase in the future, and attaining further highly enhanced capacity and highly enhanced output has been eagerly desired.

The lithium ion secondary battery is composed of positive and negative electrodes having at least an active material capable of reversibly inserting/extracting lithium ions and a separator which is arranged in a container and separates the positive electrode from the negative electrode, the container being filled with a non-aqueous electrolytic solution.

The positive electrode is prepared by applying an electrode agent containing a positive electrode active material for a lithium ion battery (hereinafter, sometimes referred to a positive electrode active material or an active material), a conductive additive and a binding agent onto a metal foil current collector made of aluminum and the like and subjecting it to pressure forming. As the current positive electrode active material, a powder of composite oxides of lithium and a transition metal (hereinafter, sometimes referred to as lithium metal oxides) such as lithium cobaltate ($LiCoO_2$), lithium nickelate ($LiNiO_2$), or a ternary system material in which a portion of cobalt is substituted with nickel and manganese ($LiMn_xNi_yCo_{1-x-y}O_2$), and spinel type lithium manganate ($LiMn_2O_4$) has been used relatively frequently. Since these materials contain a so-called rare earth element, there is a problem in terms of cost and stable supply. In recent years, olivine-based materials (phosphate-based materials) with a high level of safety have been attracting attention, and above all, lithium iron phosphate ($LiFePO_4$) containing iron which is one of the abundant resources and is inexpensive has begun to be put into practical use, and moreover, lithium manganese phosphate ($LiMnPO_4$) with a high level of output energy has also been attracting attention as a next-generation active material.

Separately, metal oxides such as $V_2O_5$, metallic compounds such as $TiS_2$, $MoS_2$ and $NbSe_2$, and the like have also been utilized.

Moreover, the negative electrode is prepared, as with the positive electrode, by applying an electrode agent containing an active material, a conductive additive and a binder agent onto a metal foil current collector made of copper and the like and subjecting it to pressure forming, and in general, as the active material for the negative electrode, lithium metal, lithium alloys such as a Li—Al alloy and Li—Sn, silicon compounds in which SiO, SiC, SiOC and the like are the basic constituent elements, conductive polymers prepared by doping lithium into polyacetylene, polypyrrole and the like, intercalation compounds prepared by allowing lithium ions to be incorporated into crystals, carbon materials such as natural graphite, artificial graphite and hard carbon, and the like have been used.

In the active materials currently put into practical use, a theoretical capacity of the positive electrode is far lower than that of the negative electrode, and hence it is indispensable to improve a capacity density of the positive electrode for increasing a capacity of the lithium ion battery. In recent years, for example an olivine-based positive electrode active material, a solid solution-based active material and the like, many active materials are investigated, which have not been put into practical use regardless of their high capacity since the conductivity thereof is low. In order to put these positive electrode active materials into practical use, a technology of imparting electrical conductivity to the positive electrode is required.

In order to improve the electron conductivity in the positive electrode, a technique of adding a conductive additive is employed. Examples of materials heretofore used as the conductive additive include graphite, acetylene black, Ketjen Black and the like. However, particularly, in the positive electrode active material having low electrical conductivity, it is insufficient only to add the conductive additive, and it requires a technique of directly forming an active material/conductive carbon material composite.

Patent Document 1 discloses a technique of coating the positive electrode active material with carbon. Further, Patent Document 2 and Non-Patent Document 1 disclose a technique in which a graphene oxide and a positive electrode active material are mixed and then the resulting mixture is reduced. Non-Patent Document 2 disclose a technique in which a positive electrode active material is synthesized in the presence of a graphene oxide, and then reduced. Patent Document 3 and Patent Document 4 disclose a technique in which a positive electrode paste including a graphene oxide is applied onto a current collector and dried, and then the graphene oxide is thermally reduced.

PRIOR ART DOCUMENTS

Patent Documents

Patent Document 1: JP Patent No. 4043852
Patent Document 2: Japanese Patent Laid-open Publication No. 2012-99467
Patent Document 3: Japanese Patent Laid-open Publication No. 2013-030463
Patent Document 4: Japanese Patent Laid-open Publication No. 2013-145740

NON-PATENT DOCUMENT

NON-PATENT DOCUMENT 1: Qin Z., et al. Journal of Materials Chemistry, 2011, 22, 21144

NON-PATENT DOCUMENT 2: Wang H., et al. Angewandte Chemie International Edition, 2011, 50, 7364

SUMMARY OF THE INVENTION

Problems to be Solved by the Invention

In Patent Document 1, the positive electrode active material is provided with carbon coating by mixing the positive electrode active material with a sucrose and heating the resulting mixture at 700° C. under an inert atmosphere; however high battery performance cannot be achieved in this technique since a periphery of the positive electrode active material is covered with carbon in which a functional group is virtually absent.

In Patent Document 2 and Non-Patent Document 1, a graphene oxide and an active material are mixed with a ball mill and then reduced to achieve formation of a composite; however, in both cases, since a material is heated at elevated temperatures of 500° C. to 800° C. in a reducing atmosphere or an inert atmosphere, there is little functional group in the graphene and ionic conductivity is poor, and therefore high battery performance cannot be achieved.

In Patent Document 3, after a graphene oxide and a positive electrode active material are mixed in a solvent, the resulting mixture is applied onto a current collector and heated in vacuum to prepare an electrode film composed of graphene and the positive electrode active material. In Patent Document 4, a graphene oxide, a positive electrode active material and a binder are mixed in a solvent, and then the resulting mixture is applied onto a current collector, dried and heated at 170° C. to obtain an electrode film. In the techniques described in Patent Documents 3 and 4, the graphene and the positive electrode active material are merely mixed and a composite thereof is not formed, and therefore excellent electron conductivity cannot be attained.

In Non-Patent Document 2, a positive electrode active material is synthesized in the presence of a graphene oxide, and then reduced to obtain a composite; however, since the graphene oxide with a very low oxidation degree is used and further a material is heated in a reducing atmosphere, there is little functional group in the graphene and ionic conductivity is poor, and therefore high battery performance cannot be achieved.

It is an object of the present invention to provide a positive electrode active material/graphene composite which have high electron conductivity and high ionic conductivity, and to provide a lithium ion battery having a high capacity and high power by using the composite as a positive electrode material.

Solutions to the Problems

The present inventors have thought that in order to realize an increase in capacity and an increase in power of the positive electrode of the lithium ion battery, it is necessary to have not only electron conductivity but also high ionic conductivity; however, when the positive electrode active material is covered with graphene, transfer of ions may be interfered with at the surface of the positive electrode active material to deteriorate ionic conductivity. Thus, the present inventors have noted the ionic conductivity of graphene and thought that the ionic conductivity of graphene may be enhanced by appropriately introducing a functional group into the graphene and that it may be appropriate to control the reduction conditions (reduction atmosphere, reduction temperature, presence or absence of a reducing agent) of the graphene oxide in order to introduce a functional group into the graphene, and they made investigations.

As a result of earnest investigations, they found that by controlling reduction conditions of the graphene oxide, positive electrode active material/graphene composite particles (sometimes, referred to as merely "composite particles") which have high electron conductivity and high ionic conductivity, and a positive electrode material for a lithium ion battery (sometimes, referred to as merely "positive electrode material") using the composite particles can be attained.

That is, composite particles of the present invention are positive electrode active material/graphene composite particles formed by formation of positive electrode active material particles/matrix containing graphene composite, wherein a ratio of functionalization is not less than 0.15 and not more than 0.80, the ratio of functionalization being determined from the following equation based on measurements by X-ray photoelectron spectroscopic measurement.

Ratio of functionalization=[(peak area based on C—O single bond)+(peak area based on C=O double bond)+(peak area based on COO bond)]/(peak area based on C—C, C=C and C—H bonds).

Further, a first method for manufacturing composite particles of the present invention is:

a method for manufacturing positive electrode active material/graphene composite particles, wherein after a precursor is prepared by formation of graphene oxide/positive electrode active material particles composite, the precursor is heated at a temperature of 150° C. to 250° C. in the air to reduce the graphene oxide, and a second method for manufacturing composite particles of the present invention is:

a method for manufacturing positive electrode active material/graphene composite particles, wherein after a precursor is prepared by formation of graphene oxide/positive electrode active material particles composite, the precursor is treated with a reducing agent to reduce the graphene oxide.

Effects of the Invention

The positive electrode active material/graphene composite particles have combined high electron conductivity and high ionic conductivity by forming graphene with a functional group appropriately present/positive electrode active material composite. Further, it is possible to attain a lithium ion secondary battery having a high capacity and a high output by using the composite particles of the present invention as a positive electrode material.

BRIEF DESCRIPTION OF THE DRAWINGS

FIG. 1 is a view showing a peak derived from carbon and results of peak-fitting at the time when the X-ray photoelectron spectrum of the positive electrode active material/graphene composite particles of the present invention was measured according to Measurement Example 1.

EMBODIMENTS OF THE INVENTION

<Positive Electrode Active Material/Graphene Composite Particle>

[Positive Electrode Active Material Particle]

The positive electrode active material for a lithium ion battery in the present invention is not particularly limited and may be employed as long as it acts as a positive electrode in a lithium secondary battery. For example, layered oxide-based active materials such as lithium cobaltate ($LiCoO_2$), lithium-rich active materials, spinel type positive electrode active materials such as lithium manganate ($LiMn_2O_4$), metal oxide active materials such as $V_2O_5$, metal compound-based active materials such as $TiS_2$, $MoS_2$ and $NbSe_2$, and olivine-based active materials such as lithium iron phosphate and lithium manganese phosphate can be used, and among these materials, layered oxide-based active materials, lithium-rich active materials, and olivine-based active materials are preferably used.

The kind of the layered oxide-based active material is not particularly limited; however, from a capacity and power, and performance as a positive electrode material for a lithium ion secondary battery, $LiCoO_2$, $LiNiO_2$, $Li(Ni_xCo_y)O_2$ (x+y=1), $Li(Ni_xCo_yAl_z)O_2$ (x+y+z=1), $Li(Ni_xMn_yCo_z)O_2$ (x+y+z=1), $Li(Ni_xMn_y)O_2$ (x+y=1), and $Li_2MnO_3$—Li ($Ni_xMn_yCo_z$)$O_2$ (x+y+z=1) can be suitably used. Among these, $Li_2MnO_3$—Li ($Ni_xMn_yCo_z$)$O_2$ (x+y+z=1), which is a lithium-rich active material, is a next-generation active material with a high battery capacity but it has low electron conductivity for a material, and therefore a technology of the present invention can be suitably applied to it.

The kind of the olivine-based active materials is not particularly limited, and the olivine-based active material is a substance represented by $LiMPO_4$, $Li_2MPO_4F$, or $Li_2MSiO_4$ (in any of these, M is one or more metal elements selected from among Ni, Co, Fe and Mn), and includes mixtures thereof. Although each of these olivine-based active materials is an electrode having a high capacity and high potential, it has low ionic conductivity, and therefore the high effect of improving battery performance can be achieved by applying it to the present invention.

Further, the active material in the present invention may contain, as a doping element metal, one or more metal elements selected from the group consisting of Na, Mg, K, Ca, Sc, Ti, V, Cr, Cu, Zn, Rb, Sr, Y, Zr, Nb, Mo, Tc, Ru, Rh, Pd, Ag, Cd, In, Sn, Cs and Ba in a weight ratio of less than 10% with respect to the active material.

In the composite particle of the present invention, the positive electrode active material particles exist, as a primary particle, in a particle in which they form a composite with a matrix containing graphene, described later. The primary particle referred to herein refers to a particle which is contained in the composite particle and has a smaller size than the composite particle. A particle diameter of the positive electrode active material particle can be measured by a transmission electron microscope. A cross-section of the composite particle is exposed by using an ion milling system, and the cross section is observed using a transmission electron microscope, and thereby a shape of the positive electrode active material particle present in the composite particle can be observed. When by this technique, the positive electrode active material particle was observed at such a magnification that 50 to 200 positive electrode active material particles are present within a field of view, an average particle diameter of all particles within the field of view is defined as an average particle diameter of the positive electrode active material particle. A mean of a maximum diameter and a minimum diameter of a particle is taken as a particle diameter of one particle.

Generally, since the electron conductivity within the positive electrode active material is lower than that of graphene, the shorter the electron transfer distance in the active material is or the smaller the average particle diameter is, the higher the efficiency of charge-discharge is. On the other hand, when the positive electrode active material particle is too small and a ratio of a crystal interface to a crystal size increases, a capacity per a particle is reduced. From these viewpoints, the average particle diameter of the positive electrode active material particle is preferably 3 to 100 nm, more preferably 5 to 50 nm, and most preferably 10 to 30 nm.

[Matrix Containing Graphene]

The matrix in the composite particle of the present invention has the active material particles embedded therein and has a function of binding the active material particles to one another to form a composite particle, and the matrix structurally refers to a portion other than the positive electrode active material particles in the composite particle. That is, viewed from a composite particle side, the active material particles are dispersed and distributed in the matrix.

The graphene generally refers to a sheet of a $sp^2$-bonded carbon atom (monolayer graphene), which has a thickness of an atom, but in the present invention, a substance having a flake-like morphology in which the monolayer graphenes are laminated is also referred to as graphene.

The thickness of graphene to be used in the present invention is not particularly limited; however, it is preferably 100 nm or less, more preferably 50 nm or less and particularly preferably 20 nm or less. The size in a direction parallel with a graphene layer is not particularly limited; however, when the size is too small, since a conductive path per one graphene is short, electrical conductivity is deteriorated under the influence of contact resistance between graphenes. Therefore, the size of the graphene in the present invention is preferably large to some extent. A size in a direction parallel with a graphene layer is preferably 0.5 μm or more, more preferably 0.7 μm or more, and moreover preferably 1 μm or more. Herein, the size in a direction parallel with a graphene layer refers to an average of the maximum diameter and the minimum diameter at the time of being viewed from a direction perpendicular to a plane direction of the graphene.

The graphene contained in the matrix is partially functionalized in order to maintain the ionic conductivity. The functionalization means that a part of the graphite structure of carbon is modified with a hydroxyl group, a carboxyl group, a ketone group or an epoxy group.

In the present invention, the graphene in the matrix needs to be appropriately functionalized, but it is difficult to extract only graphene from the matrix and measure a degree of functionalization of the graphene. Therefore, in the present invention, the invention is specified by the degree of functionalization measured as a whole composite particle.

The ratio of functionalization can be determined by X-ray photoelectron spectroscopic measurement. In the X-ray photoelectron spectroscopic measurement, it is known that when a sample containing carbon is measured, a peak derived from carbon is detected around 284 eV, and a peak is shifted to a high energy side when the carbon is bonded to oxygen. Specifically, the peaks based on a C—C bond, a C═C bond and a C—H bond, in which carbon is not bonded to oxygen, are not shifted and detected around 284 eV, and the peak based on a C—O bond is shifted to around 286 eV, the peak based on a C═O bond is shifted to around 287.5 eV, and the peak based on a COO bond is shifted to around 288.5 eV. Therefore, the signal derived from carbon is detected in the form of superimposing the peaks around 284 eV, around 286 eV, around 287.5 eV, and around 288.5 eV. It is possible to calculate an area of each peak by separating the peak derived from carbon into a peak of each component by peak-fitting, and therefore it is found how far carbon is functionalized. The signal also appears around 286 e and around 290.5 eV as a signal derived from a graphite component. On this signal, fitting is performed as a component based on a C—C bond, a C=C bond and a C—H bond. FIG. 1 shows the peak derived from carbon and the results of peak-fitting at the time when the X-ray photoelectron spectrum of the composite particle was measured according to Measurement Example 1. Each of the components indicated by a solid line is a component of the functionalized carbon and a component indicated by a dotted line is a component based on a C—C bond, a C=C bond and a C—H bond. That is, the ratio of functionalization in the present invention is a numerical value defined by Ratio of functionalization=[(peak area based on C—O bond)+(peak area based on C=O bond)+(peak area based on COO bond)]/(peak area based on C—C, C=C and C—H bonds).

The composite particle of the present invention has a ratio of functionalization of 0.15 or more. However, when the ratio of functionalization is too high, a graphite structure collapses to deteriorate electron conductivity. In order to maintaining the electron conductivity, the ratio of functionalization needs to be 0.80 or less. From these viewpoints, the ratio of functionalization is preferably 0.17 or more, more preferably 0.20 or more, and moreover preferably 0.30 or more. Further, the ratio of functionalization is preferably 0.60 or less, and more preferably 0.40 or less.

In a Raman spectrometric method, the carbon material has a peak around 1590 cm$^{-1}$ (G band peak) based on a graphite structure. A peak position of the G band peak is shifted to a high energy side as the defect of the graphite structure increases. In the composite particle in the present invention, since the graphene in the matrix is appropriately functionalized, peak position preferably lies on a relatively high energy side, and specifically, the peak position lies 1600 cm$^{-1}$ or more.

In order to maintain efficient electron conductivity/ionic conductivity, the graphene preferably has high uniformity at a level of a crystallite size. The higher uniformity of the graphene at a level of a crystallite size is, the smaller a peak half bandwidth of the G band peak is. The peak half bandwidth of the G band peak is preferably 90 cm$^{-1}$ or less and more preferably 80 cm$^{-1}$ or less.

In addition, all Raman measurement in the present invention was performed at an excited wavelength of 514.5 nm using argon ion laser as excited laser.

The matrix containing graphene in the composite particle of the present invention preferably has voids, and the void ratio in this case is preferably not less than 10% and not more than 50%. When appropriate voids are present in the matrix, the electrolytic solution within the composite particle smoothly moves and therefore ionic conductivity can be further improved. When the void ratio is too high, contact between the matrix containing graphene and the positive electrode active material particles becomes poor, resulting in deterioration of electron conductivity. The void ratio is more preferably 40% or less, and moreover preferably 30% or less. On the other hand, when the void ratio is too low, movement of the electrolytic solution is slow, resulting in deterioration of ionic conductivity. Accordingly, the void ratio is more preferably 15% or more, and moreover preferably 20% or more.

The void ratio of the matrix can be analyzed from an electron scanning microscope image of a cross section of the composite particle. Specifically, the cross sections of the composite particle is exposed by an ion milling system (manufactured by Hitachi High-Technologies Corporation, IM4000, etc.), and the cross section is observed at a magnification of 10000 times using an electron scanning microscope. Of the cross section in which a composite is formed, a portion of the conductive matrix and a portion of the positive electrode active material particles can be distinguished from each other based on contrast difference. The void ratio can be measured by determining a ratio of the void area to an area of the whole matrix by image processing.

In the composite particle of the present invention, when graphene is unevenly distributed at the surface, the ionic conductivity at the particle surface is deteriorated. An uneven distribution of the graphene at the material surface can be quantified by a value obtained by dividing a ratio of a carbon element at the material surface by a mass ratio of graphene in the whole material, and when this value is higher, the graphene is unevenly distributed at the surface. In order to pursue high electron conductivity and ionic conductivity simultaneously, this value is preferably 1.5 or more, and more preferably 2 or more. Further, the value is preferably 7 or less, and more preferably 6 or less. The ratio of a carbon element at the material surface can be measured by X-ray photoelectron spectroscopy. In the X-ray photoelectron spectrum, the proportion of a carbon atom in all elemental composition detected is taken as the ratio of a carbon element at the material surface. In the X-ray photoelectron spectroscopy, an excited X-ray is monochromatic Al K$_{\alpha 1}$ and K$_{\alpha 2}$ lines (1486.6 eV), and a diameter of X-ray was set to 200 μm, and a photoelectron escape angle was set to 45°.

In addition, the ratio of a carbon element at the material surface is preferably low since when it is too high, ionic conductivity of the surface is deteriorated. The ratio of a carbon element at the material surface is preferably 50% or less, more preferably 30% or less, and moreover preferably 20% or less.

A mass ratio of carbon in the whole composite particles of the present invention is not particularly limited; however, when a ratio of carbon is higher, electrical conductivity becomes higher but a battery capacity per weight of the composite particles is reduced. Therefore, the mass ratio of carbon in the whole composite particles is preferably 20% or less, more preferably 10% or less, and moreover preferably 8% or less. The mass ratio is preferably 2% or more, more preferably 3% or more, and moreover preferably 4% or more. In addition, the mass ratio of graphene contained in the composite particle of the present invention can be quantified by a carbon-sulfur analyzer. In a carbon-sulfur analyzer, a composite is heated in the air by a high-frequency, carbon contained in the composite is completely oxidized, and generated carbon dioxide is detected by infrared rays. As a measurement apparatus, a carbon-sulfur analyzer EMIA-810W manufactured by HORIBA, Ltd. is exemplified.

When a particle diameter of the composite particle in the present invention is too small, particles are easily aggregated in preparing an electrode paste, and therefore a problem that it becomes difficult to prepare an electrode coating arises. When a particle diameter is too large, it takes much time for an electrolytic solution to permeate inside of the composite particle and ionic conductivity is deteriorated. Therefore, the particle diameter of the composite particle is preferably 0.5 μm or more, more preferably 1.0 μm or more, and moreover preferably 3.0 μm or more. The particle diameter is preferably 20 μm or less, more preferably 15 μm or less, and moreover preferably 10 μm or less. Herein, the particle diameter of the composite particle refers to a median diameter measured by a laser diffraction scattering apparatus.

This measurement is carried out at a transmittance adjusted to 75% to 95% in an aqueous dispersion system.

<Method for Manufacturing Positive Electrode Active Material/Graphene Composite Particles>

The method for manufacturing positive electrode active material/graphene composite particles of the present invention includes a step of mixing/pulverizing graphene oxide and positive electrode active material particles for a lithium ion battery and a step of reducing the graphene oxide.

[Graphene Oxide]

The graphene oxide can be prepared by a publicly known method. Moreover, commercially available graphene oxide may be purchased. Graphite which is oxidized is also referred to as a graphite oxide; however, the graphite oxide is included in the graphene oxide in the present specification since the graphite oxide becomes a graphene powder depending on reduction conditions when being reduced. When graphite is oxidized, its interlayer distance is lengthened and graphite comes to have a diffraction peak at a diffraction angle of 9.0° to 13.0° in X-ray diffraction measurement.

A graphite serving as a raw material of the graphene oxide may be either an artificial graphite or a natural graphite; however, the natural graphite is preferably used. The number of meshes to which a particle size of the raw material graphite corresponds is preferably 20000 or less, and more preferably 5000 or less.

A preparation method of the graphene oxide is preferably an improved Hummers' method. An example of the Hummers' method will be mentioned below. Graphite (e.g., black lead powder etc.) was used as a raw material, and to this, a concentrated sulfuric acid, sodium nitrate and potassium permanganate are added, and the resulting mixture is reacted under temperatures of 25° C. to 50° C. for 0.2 to 5 hours while being stirred. Thereafter, a reactant is diluted by adding deionized water to obtain a suspension, and the suspension is reacted at a temperature of 80° C. to 100° C. for 5 to 50 minutes. Finally, hydrogen peroxide and deionized water are added, and the resulting mixture is reacted for 1 to 30 minutes to obtain a graphene oxide dispersion. The obtained graphene oxide dispersion is filtered and washed to obtain a graphene oxide dispersion.

A ratio between reactants, for example, black lead powder, concentrated sulfuric acid, sodium nitrate, potassium permanganate and hydrogen peroxide, is 10 g:150 to 300 ml: 2 to 8 g:10 to 40 g:40 to 80 g. When concentrated sulfuric acid, sodium nitrate and potassium permanganate are added, the temperature is controlled by means of an ice bath. When hydrogen peroxide and deionized water are added, the mass of deionized water is 10 to 20 times the mass of hydrogen peroxide.

Since the oxidation degree of the graphene oxide has the effect on the ratio of functionalization of the graphene obtained by being reduced, the graphene oxide preferably has an appropriate oxidation degree. Specifically, it is preferred that an elemental ratio of oxygen atoms in the graphene oxide to carbon atoms be not less than 0.3 and not more than 1.0. The ratio of oxygen atoms to carbon atoms in the graphene oxide can be measured by an X-ray photoelectron spectroscopy.

The oxidation degree of the graphene oxide can be adjusted by varying an amount of an oxidant to be used for the oxidation reaction of graphite. Specifically, the larger the amounts of sodium nitrate and potassium permanganate to be used in the oxidation reaction are with respect to the amount of graphite, the higher the oxidation degree of the graphene oxide becomes, and the smaller the amounts of sodium nitrate and potassium permanganate are, the lower the oxidation degree of the graphene oxide becomes. A weight ratio of sodium nitrate to graphite is not particularly limited; however, it is preferably not less than 0.2 and not more than 0.8. A weight ratio of potassium permanganate to graphite is not particularly limited; however, it is preferably not less than 1 and not more than 4.

[Preparation of Precursor Particle]

A technique of forming the graphene oxide/positive electrode active material particles composite is not particularly limited, and it is possible to form a composite by pulverizing/mixing the graphene oxide and the positive electrode active material particles by using a publicly known mixer/kneader. Specific examples thereof include a method of pulverizing/mixing the graphene oxide and the positive electrode active material particles by utilizing an automatic mortar, a three roll mill, a bead mill, a planetary ball mill, a homogenizer, a planetary mixer, a biaxial kneader or the like. Among these, a planetary ball mill is suitable for mixing two different powders.

A shape of the composite particle is preferably formed into a sphere in order to maintain high coating density, and when a particle size is less than 1 μm, it is preferred to increase a particle size by granulation. Further, the particle size can be uniformized by classification. In this way, it is possible to obtain precursor particles in which the graphene oxide forms a composite with the positive electrode active material particles.

As a method of granulation, in addition to spray drying, apparatuses such as Hybridizer (manufactured by Nara Machinery Co., Ltd.), Nobilta (registered trademark) (manufactured by HOSOKAWA MICRON CORPORATION) and Vertical Granulator (manufactured by Powrex Corporation), which respectively perform granulation in a powder state, can be used.

As a method of classification, an airflow-classification machine, a sieve and the like can be used. Examples thereof include Spin Air Sieve (manufactured by Seishin Enterprise Co., Ltd.), High-precision Air Dispersion Separator MDS-2 (manufactured by Nippon Pneumatic Mfg. Co., Ltd.), and the like.

[Reduction of Precursor Particle]

The composite particles of the present invention can be produced by reducing the precursor particles obtained by forming the graphene oxide/positive electrode active material particle composite. A reduction method at this time includes a step of heating the precursor particles at a temperature of 150° C. to 250° C. in the air to reduce the graphene oxide, a step of reducing the precursor particles with a reducing agent, or a step of a combination of these steps.

A thermal reduction method is a reduction technique of the graphene oxide, and in a common thermal reduction method, the graphene oxide is reduced at elevated temperatures of 500° C. or higher in an inert gas atmosphere or in a reducing gas atmosphere. However, when the graphene is reduced in such a condition, most of functional groups at the graphene surface are lost, resulting in a reduction of ionic conductivity. Thus, in the thermal reduction, the ratio of functionalization can be increased by reducing the graphene oxide at a relatively low temperature in the air. When the thermal reduction method is employed, it is necessary to perform reduction treatment in a temperature condition of not less than 150° C. and not more than 250° C. in the air, and more preferably not less than 150° C. and not more than 200° C.

A method of using a reducing agent is another reduction technique of the graphene oxide. The reducing agent referred to herein is limited to a substance which exists in a liquid or solid state at ordinary temperature, and it does not include a reducing gas. The reduction method of using a reducing agent is suitable for maintaining the ratio of functionalization in the graphene since the reduction does not proceed so much in this method as in the thermal reduction method in which an atmosphere is controlled.

Examples of the reducing agent include organic reducing agents and inorganic reducing agents. Examples of the organic reducing agents include aldehyde-based reducing agents, hydrazine derivative reducing agents, and alcoholic reducing agents, and among organic reducing agents, alcoholic reducing agents are particularly suitable since they can be reduced relatively mildly. Examples of the alcoholic reducing agents include methanol, ethanol, propanol, isopropyl alcohol, butanol, benzyl alcohol, phenol, catechol, ethanolamine, dopamine, ethylene glycol, propylene glycol, diethylene glycol, and the like, and benzyl alcohol, catechol and dopamine are particularly suitable.

Examples of the inorganic reducing agent include sodium dithionite, potassium dithionite, phosphorous acid, sodium borohydride, hydrazine and the like, and among the inorganic reducing agents, sodium dithionite and potassium dithionite are suitably used since they can reduce the graphene oxide while relatively maintaining a functional group.

When the layered oxide-based active material is used as the active material, a technique of reducing the graphene oxide at temperatures of 150° C. to 250° C. in the air is suitable since the layered oxide-based active material is easily modified with the reducing agent. On the other hand, since the olivine-based active material is stable and hardly modified with the reducing agent, a technique of reducing the olivine-based active material with the use of the reducing agent is suitable.

In the reduction of the graphene oxide, a technique of thermally reducing it at temperatures of 150° C. to 250° C. in the air, as described above, may be combined with a technique of reducing it with the reducing agent, and this combination makes it more easy to control the ratio of functionalization of graphene.

[Preparation of Void]

The composite particle in the present invention preferably has voids in the matrix containing graphene. Such voids can be suitably prepared by forming a composite of graphene oxide, positive electrode active material particles and an additive capable of being removed by heating or dissolution in preparing a composite and removing the additive after the formation of the composite.

In the present invention, the additive to be used in preparation of voids is not particularly limited as long as it is a substance capable of being removed by heating or dissolution; however, the additive preferably has plasticity and can be mixed well with the graphene oxide. The phrase "having plasticity" refers to having the property of being easily deformed in applying physical force and easily maintaining a deformed shape. Particularly is preferred a material which has such thermal plasticity that has flowability at elevated temperatures and does not have the flowability at ordinary temperatures. The additive easily penetrates inside of the graphene oxide and easily prepares voids by having plasticity.

Further, that the additive can be mixed well with the graphene oxide means being soluble in a solvent, specifically water or N-methylpyrrolidone, in which the graphene oxide can be dissolved, and the additive is preferably dissolved in an amount of 1 wt % or more in the solvent.

Examples of the substance capable of being removed by heating or dissolution include water-soluble inorganic salts, sulfur, polymer and solutions thereof. As the substance capable of being removed by heating, a substance capable of being removed in an inert atmosphere at 400° C. or lower is preferred. When a solution is used for the preparation of voids, a solvent is not particularly limited; however, a solvent such as water or N-methylpyrrolidone, in which the graphene oxide can be dissolved, is preferred. The phrase "the graphene oxide can be dissolved" means to be dissolved in an amount of 1 wt % or more. Particularly, a polymer can be suitably used since many polymers have plasticity, and the polymer easily penetrates inside of the graphene oxide and easily prepares voids. Particularly, a polymer having thermal plasticity is preferred, and specifically, a polymer having a low glass transition temperature is preferred. The glass transition temperature of the polymer used for the additive is preferably 100° C. or lower, and more preferably 50° C. or lower.

Examples of the water-soluble inorganic salts include sodium chloride, potassium chloride, sodium nitrate, sodium sulfate, potassium nitrate, sodium carbonate, sodium hydrogen carbonate, potassium carbonate, and potassium hydrogen carbonate.

Examples of the polymers include polyethylene, polypropylene, polyethylene glycol, polypropylene glycol, polyvinyl alcohol, polyethylene terephthalate, polystyrene, polymethylmethacrylate, dextran, and copolymers thereof. Particularly, polyethylene glycol and polyvinyl alcohol are preferably used since they are water-soluble, are easily mixed with the graphene oxide, and can be removed only by heating.

The graphene oxide has high compatibility with a polar solvent and particularly has very high solubility in water and N-methylpyrrolidone, and therefore if the additive can be dissolved in these solvents, it is suitable since the additive is easily mixed well with the graphene oxide.

An amount of the additive to be added is not particularly limited; however, the void ratio of the composite particle can be controlled by adjusting the amount of the additive to the graphene oxide. Thus, it is preferred to adjust the amount of the additive so that the void ratio is not less than 10% and not more than 50%.

Since the relationship between the amount of the additive and the void ratio varies depending on the kind of additive, the preferable amount of the additive is not uniquely set; however, for example, when a polymer is used, a weight ratio of the amount of the additive to that of the graphene oxide is preferably not less than 0.3 and not more than 3. Further, the above-mentioned additives may be mixed for use.

A technique of mixing the graphene oxide, the positive electrode active material and the additive is not particularly limited, and a publicly known mixer/kneader can be used. Specific examples thereof include a method of utilizing an automatic mortar, a three roll mill, a bead mill, a planetary ball mill, a homogenizer, a planetary mixer, a biaxial kneader or the like. Among these, a planetary ball mill is suitable for mixing two different powders.

EXAMPLES

Measurement Example 1

Measurement of X-ray photoelectron of each sample was carried out by using Quantera SXM (manufactured by Physical Electronics, Inc. (PHI)). An excited X-ray is monochromatic Al $K_{\alpha1}$ and $K_{\alpha2}$ lines (1486.6 eV), and a diameter of X-ray was set to 200 μm, and a photoelectron escape angle was set to 45°.

The ratio of functionalization is determined by a peak shift of a peak based on a carbon atom by narrow scan. Specifically, the peaks based on a carbon atom are separated into four component peaks of the peak around 284 eV based on a C=C bond and a C—H bond, the peak around 286 eV based on a C—O bond, the peak around 287.5 eV based on a C=O bond and the peak around 288.5 eV based on a COO bond, and the ratio of functionalization is determined from an area ratio between areas of these peaks. A ratio of oxygen atoms to carbon atoms in the graphene oxide is determined from a peak area of oxygen atoms and a peak area of carbon atoms respectively measured by wide scan.

Measurement Example 2

Raman measurement was carried out by using Ramanor T-64000 (manufactured by Jobin Yvon GmbH/Atago Bussan Co., Ltd.). A beam diameter was 100 μm and argon ion laser (wavelength: 514.5 nm) was used as a light source.

Measurement Example 3

The electrode plate prepared in the following Examples was cut out into a piece of 15.9 mm in diameter as a positive electrode, a lithium foil cut out into a size of 16.1 mm in diameter and 0.2 mm in thickness was used as a negative electrode, Celgard #2400 (manufactured by Celgard Inc.) cut out into a size of 17 mm in diameter was used as a separator, and a solvent composed of ethylene carbonate containing $LiPF_6$ with a concentration of 1M and diethylene carbonate in proportions of 7:3 was used as an electrolyte to prepare a 2042 type coin battery, and electrochemical evaluations were carried out.

In charging and discharging measurement, when the active material is $LiMnPO_4$, an upper limit voltage was set to 4.4 V and a lower limit voltage was set to 2.7 V, when the active material is $LiFePO_4$, an upper limit voltage was set to 4.0 V and a lower limit voltage was set to 2.5 V, when the active material is $LiMn_2O_4$, an upper limit voltage was set to 4.3 V and a lower limit voltage was set to 2.7 V, when the active material is $LiNi_{1/3}Mn_{1/3}CO_{1/3}O_2$, an upper limit voltage was set to 4.2 V and a lower limit voltage was set to 3.0 V, and the battery was discharged at a rate of 1 C three times and subsequently discharged at a rate of 10 C three times, and the capacity at the time of third discharge in each rate was taken as a discharge capacity.

In the case where the active material is a Li-rich active material, charge-discharge, in which a constant current charge of the battery is performed at a current rate of 0.1 C up to an upper limit voltage of 4.5 V and then discharge was performed to 2.0, was repeated twice, and subsequently charging and discharging were performed to an upper limit voltage of 4.6 V and a lower limit voltage of 2.0 V, respectively, twice, charging and discharging were performed to an upper limit voltage of 4.7 V and a lower limit voltage of 2.0 V, respectively, twice, charging and discharging were performed to an upper limit voltage of 4.8 V and a lower limit voltage of 2.0 V, respectively, three times, and the capacity at the time of third discharge was taken as a discharge capacity.

Measurement Example 4

A composite particle was kneaded together with an epoxy resin and the resulting mixture was applied onto a PET film and cured to embed the composite particle in the resin. This film was subjected in whole to milling by an ion milling system (manufactured by Hitachi Ltd., IM4000) to expose cross sections of the resin and the composite particle. The cross section of the composite particle was observed at a magnification of 10000 times using an electron scanning microscope (manufactured by Hitachi Ltd., S-5500), and a void area per cross-sectional area of the particle was determined by image processing to define it as a void ratio.

Measurement Example 5

A composite was heated with a high-frequency using a carbon-sulfur analyzer EMIA-920V2 (manufactured by HORIBA, Ltd.), and generated carbon dioxide was quantified to determine a ratio of conductive carbon in the composite particles.

Synthesis Example 1-1

Preparation method of graphene oxide: A natural graphite powder (produced by Shanghai Yifan Graphite Co., Ltd.) whose particle size corresponds to 2000 mesh was used as a raw material. To 10 g of the natural graphite powder in an ice bath were added 220 ml of a 98% concentrated sulfuric acid, 5 g of sodium nitrate and 30 g of potassium permanganate, and the resulting mixture was mechanically stirred for 1 hour, and a temperature of a mixed liquid was maintained at 20° C. or lower. The mixed liquid was taken out from the ice bath, and stirred for 4 hours in a water bath at 35° C. to be reacted, and thereafter a suspension obtained by adding 500 ml of ion-exchange water was further reacted at 90° C. for 15 minutes. Finally, 600 ml of ion-exchange water and 50 ml of hydrogen peroxide were added, and the resulting mixture was reacted for 5 minutes to obtain a graphene oxide dispersion. The dispersion was filtered, metal ions were washed with a dilute hydrochloric acid solution, and an acid was washed repeatedly with ion-exchange water until a pH of water becomes 7 to prepare a graphene oxide gel. The graphene oxide gel was lyophilized to obtain a graphene oxide powder. The elemental ratio of an oxygen atom to a carbon atom of the obtained graphene oxide powder was measured according to Measurement Example 1, and consequently the elemental ratio was 0.53.

Synthesis Example 1-2

A graphene oxide gel was prepared in the same manner as in Synthesis Example 1 except for changing ratios of the amounts of sodium nitrate and potassium permanganate to the amount of graphite to 70% of those in Synthesis Example 1. The graphene oxide gel was lyophilized to obtain a graphene oxide powder. The elemental ratio of an oxygen atom to a carbon atom of the obtained graphene oxide powder was measured according to Measurement Example 1, and consequently the elemental ratio was 0.45.

Synthesis Example 1-3

Preparation method of graphene oxide: 1 g of a natural graphite powder (produced by Shanghai Yifan Graphite Co., Ltd.) whose particle size corresponds to 2000 mesh and 20 g of sodium chloride were mixed for 10 to 15 minutes with a mortar, and then the resulting mixture was washed with water and dried. The dried graphite powder and 23 ml of a concentrated sulfuric acid were mixed at room temperature for 24 hours in a flask. Thereafter, the resulting mixture was heated at 40° C. while being stirred and 100 mg of sodium nitrate was added. Then, continuing stirring, 500 mg of potassium permanganate was added little by little while maintaining a temperature of the resulting mixture at 45° C. or lower so as to avoid thermal runaway and the resulting mixture was held for 30 minutes. After 3 ml of water was added and the resulting mixture was left for 5 minutes, the same operation was repeated, and then 40 ml of water was added and the resulting mixture was left for 15 minutes. Finally, 140 ml of ion-exchange water and 10 ml of hydrogen peroxide were added, and the resulting mixture was reacted for 5 minutes to obtain a graphene oxide dispersion. The dispersion was filtered, metal ions were washed with a dilute hydrochloric acid solution, and an acid was washed repeatedly with ion-exchange water until a pH of water becomes 7 to prepare a graphene oxide gel. The elemental ratio of an oxygen atom to a carbon atom of the obtained graphene oxide powder was measured according to Measurement Example 1, and consequently the elemental ratio was 0.18.

Synthesis Example 1-4

A graphene oxide gel was prepared in the same manner as in Synthesis Example 1 except for changing ratios of the amounts of sodium nitrate and potassium permanganate to the amount of graphite to 55% of those in Synthesis Example 1. The graphene oxide gel was lyophilized to obtain a graphene oxide powder. The elemental ratio of an oxygen atom to a carbon atom of the obtained graphene oxide powder was measured according to Measurement Example 1, and consequently the elemental ratio was 0.41.

Synthesis Example 1-5

A graphene oxide gel was prepared in the same manner as in Synthesis Example 1 except for changing ratios of the amounts of sodium nitrate and potassium permanganate to the amount of graphite to 200% of those in Synthesis Example 1. The graphene oxide gel was lyophilized to obtain a graphene oxide powder. The elemental ratio of an oxygen atom to a carbon atom of the obtained graphene oxide powder was measured according to Measurement Example 1, and consequently the elemental ratio was 0.64.

Synthesis Example 2

Lithium phosphate and manganous sulfate were dissolved in pure water so as to be 3:1:1 in the molar ratio of Li, Mn and P to prepare 200 ml of a precursor aqueous solution. The aqueous solution was subjected to a hydrothermal treatment at 180° C. for 24 hours in a pressure vessel and then washed with water to obtain $LiMnPO_4$ particles.

Synthesis Example 3

Such an aqueous solution that the molar ratio of lithium chloride, iron(II) chloride and phosphoric acid was 1:1:1 and the aqueous solution concentration was 0.1 mol/kg was prepared. The aqueous solution was spray-dried by using nitrogen as a carrier gas and dried at 700° C. under an inert atmosphere to obtain $LiFePO_4$ particles.

<Positive Electrode Active Material/Graphene Composite Particle Using Olivine-Based Active Material>

Example 1-1

A graphene oxide powder prepared in Synthesis Example 1-1 (0.06 g), $LiMnPO_4$ particles prepared in Synthesis Example 2 (1 g), water (0.1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain precursor particles. The precursor particles were heated in the air at 200° C. for 6 hours by using an oven to reduce the graphene oxide, and thereby, conductive carbon-$LiMnPO_4$ composite particles were obtained. The ratio of functionalization of the conductive carbon in the composite particle was measured according to Measurement Example 1, and consequently it was 0.58. The composite particles were measured according to Measurement Example 2, and consequently a G band peak derived from carbon was 1604 $cm^{-1}$ and a peak half bandwidth was 75 $cm^{-1}$. The carbon ratio in the composite was measured according to Measurement Example 5, and consequently it was 0.03.

An electrode was prepared in the following way. A mixture of the prepared conductive carbon-$LiMnPO_4$ composite particles (700 mg), acetylene black (40 mg) as a conductive additive, polyvinylidene fluoride (60 mg) as a binder and N-methylpyrrolidone (800 mg) as a solvent was mixed with a planetary mixer to obtain an electrode paste. The electrode paste was applied onto an aluminum foil (thickness: 18 μm) by using a doctor blade (300 μm) and dried at 80° C. for 30 minutes to obtain an electrode plate. A discharge capacity was measured according to Measurement Example 3, and consequently it was 149 mAh/g at a rate of 0.1 C and 124 mAh/g at a rate of 3 C.

Example 1-2

Conductive carbon-$LiFePO_4$ composite particles were obtained in the same manner as in Example 1-1 except for changing the active material to the $LiFePO_4$ particles prepared in Synthesis Example 3. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Example 1-3

A graphene oxide powder prepared in Synthesis Example 1-1 (0.06 g), $LiMn_2O_4$ particles (1 g) commercially available from Hohsen Corporation, water (0.1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain precursor particles. The precursor particles were heated in the air at 200° C. for 6 hours by using an oven to reduce the graphene oxide, and thereby, conductive carbon-$LiMn_2O_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Example 1-4

Precursor particles were obtained in the same manner as in Example 1-1. The precursor particles (1 g) and benzyl alcohol (100 g) were heated at 100° C. for 24 hours while being stirred in a flask to reduce the graphene oxide, and thereby, conductive carbon-$LiMnPO_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Example 1-5

Precursor particles were obtained in the same manner as in Example 1-1. The precursor particles (1 g) were dispersed in water (100 g) in a flask and heated at 40° C. while being stirred. To the precursor particles, sodium dithionite (1 g) was added and the resulting mixture was stirred for 1 hour while being maintained at 40° C. to reduce the graphene oxide, and thereby, conductive carbon-$LiMnPO_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Further, the void ratio of the conductive carbon matrix was measured according to Measurement Example 4, and consequently it was 3%.

Example 1-6

A graphene oxide powder prepared in Synthesis Example 1-1 (0.06 g), $LiMnPO_4$ particles prepared in Synthesis Example 2 (1 g), water (1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain precursor particles. The precursor particles were heated in the air at 200° C. for 6 hours by using an oven to reduce the graphene oxide, and thereby, conductive carbon-$LiMnPO_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Example 1-7

A graphene oxide powder prepared in Synthesis Example 1 (0.06 g), $LiMnPO_4$ particles prepared in Synthesis Example 2 (1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain precursor particles. The precursor particles were heated in the air at 200° C. for 6 hours by using an oven to reduce the graphene oxide, and thereby, conductive carbon-$LiMnPO_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Example 1-8

A graphene oxide powder prepared in Synthesis Example 1-2 (0.06 g), $LiMnPO_4$ particles prepared in Synthesis Example 2 (1 g), water (0.1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain precursor particles. The precursor particles were heated in the air at 200° C. for 6 hours by using an oven to reduce the graphene oxide, and thereby, conductive carbon-$LiMnPO_4$ composite particles were obtained. The ratio of functionalization of the composite particle, the peak position and peak half bandwidth of a G band based on the conductive carbon, and the discharge capacity of the electrode formed from the composite particles were evaluated as with Example 1-1. The results of evaluations are shown in Table 1.

Example 1-9

Precursor particles were obtained in the same manner as in Example 1-1 except for changing the graphene oxide to that prepared in Synthesis Example 1-4. The precursor particles were heated in the air at 200° C. for 6 hours by using an oven to reduce the graphene oxide, and thereby, conductive carbon-$LiMnPO_4$ composite particles were obtained. The ratio of functionalization of the composite particle, the peak position and peak half bandwidth of a G band based on the conductive carbon, and the discharge capacity of the electrode formed from the composite particles were evaluated as with Example 1-1. The results of evaluations are shown in Table 1.

Example 1-10

Precursor particles were obtained in the same manner as in Example 1-1 except for changing the graphene oxide to that prepared in Synthesis Example 1-4. The precursor particles were heated in the air at 160° C. for 6 hours by using an oven to reduce the graphene oxide, and thereby, conductive carbon-$LiMnPO_4$ composite particles were obtained. The ratio of functionalization of the composite particle, the peak position and peak half bandwidth of a G band based on the conductive carbon, and the discharge capacity of the electrode formed from the composite particles were evaluated as with Example 1-1. The results of evaluations are shown in Table 1.

Example 1-11

A composite precursor was obtained in the same manner as in Example 1-1 except for changing the graphene oxide to that prepared in Synthesis Example 1-4. The composite precursor (1 g) was dispersed in water (100 g) in a flask and heated at 40° C. while being stirred. To the composite precursor, sodium dithionite (1 g) was added and the resulting mixture was stirred for 1 hour while being maintained at 40° C. to reduce the graphene oxide, and thereby, conductive carbon-LiMnPO$_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Example 1-12

A 20% aqueous solution (gel) of graphene oxide (0.5 g), which was formed by dissolving a graphene oxide powder prepared in Synthesis Example 1-1 in water, LiMnPO$_4$ particles prepared in Synthesis Example 2 (1 g), a 20% aqueous solution of polyethylene glycol (molecular weight 100000) (0.5 g), water (0.2 g) (as a whole, LiMnPO$_4$: graphene oxide:polyethylene glycol:water=1 g:0.1 g:0.1 g:1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a composite precursor.

The composite precursor (1 g) was dispersed in water (100 g) in a flask and heated at 40° C. while being stirred. To the composite precursor, sodium dithionite (1 g) was added and the resulting mixture was stirred for 1 hour while being maintained at 40° C. to reduce the graphene oxide, and thereby, conductive carbon-LiMnPO$_4$ composite particles were obtained.

Furthermore, the conductive carbon-LiMnPO$_4$ composite particles were heated in nitrogen at 400° C. for 6 hours by using an oven to remove polyethylene glycol of an additive, and thereby, conductive carbon-LiMnPO$_4$ composite particles with voids were obtained.

The ratio of functionalization of the conductive carbon in the composite particle was measured according to Measurement Example 1, and consequently it was 0.25. A secondary particle diameter of the composite was 12 μm. The void ratio in the composite particle was measured according to Measurement Example 4, and consequently it was 32%. A cross-section of the composite particle was observed with a transmission electron microscope, and consequently it was found that graphene having a thickness of 3.0 nm or less was contained in the composite particle. Raman spectrometry of the composite particle was performed according to Measurement Example 2. The measured results of the G band peak and the peak half bandwidth are shown in Table 1. The ratio of a conductive carbon in the composite particle was measured according to Measurement Example 5. The ratio of carbon in the composite particle is shown in Table 1.

An electrode was prepared in the following way. A mixture of the prepared conductive carbon-LiMnPO$_4$ composite particles (700 mg), acetylene black (40 mg) as a conductive additive, polyvinylidene fluoride (60 mg) as a binder and N-methylpyrrolidone (800 mg) as a solvent was mixed with a planetary mixer to obtain an electrode paste. The electrode paste was applied onto an aluminum foil (thickness: 18 μm) by using a doctor blade (300 μm) and dried at 80° C. for 30 minutes to obtain an electrode plate. A discharge capacity of the electrode formed was measured according to Measurement Example 3, and consequently it was 152 mAh/g at a rate of 0.1 C and 125 mAh/g at a rate of 3 C. The results of evaluations are shown in Table 1.

Example 1-13

A 20% aqueous solution (gel) of graphene oxide (0.5 g), which was formed by dissolving a graphene oxide powder prepared in Synthesis Example 1-1 in water, LiMnPO$_4$ particles prepared in Synthesis Example 2 (1 g), a 10% aqueous solution of sodium hydrogen carbonate (0.5 g), water (0.15 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a composite precursor.

The composite precursor (1 g) was dispersed in water (100 g) in a flask and heated at 40° C. while being stirred. To the composite precursor, sodium dithionite (1 g) was added and the resulting mixture was stirred for 1 hour while being maintained at 40° C. to reduce the graphene oxide, and thereby, conductive carbon-LiMnPO$_4$ composite particles were obtained.

Moreover, the sodium hydrogen carbonate was removed from the composite particles by water washing to obtain conductive carbon-LiMnPO$_4$ composite particles with voids.

In the same manner as in Example 1-12, measurement of the void ratio of the matrix of the composite particle, Raman spectrometry, measurement of a conductive carbon ratio, and measurement of the discharge capacity of the electrode formed were performed and evaluated in the same manner as in Example 1-1. The results of evaluations are shown in Table 1.

Example 1-14

A 20% aqueous solution (gel) of graphene oxide (0.5 g), which was formed by dissolving a graphene oxide powder prepared in Synthesis Example 1-1 in water, LiMnPO$_4$ particles prepared in Synthesis Example 2 (1 g), a 25% aqueous solution of polyethylene glycol (molecular weight 100000) (2 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a composite precursor.

The composite precursor (1 g) was dispersed in water (100 g) in a flask and heated at 40° C. while being stirred. To the composite precursor, sodium dithionite (1 g) was added and the resulting mixture was stirred for 1 hour while being maintained at 40° C. to reduce the graphene oxide, and thereby, conductive carbon-LiMnPO$_4$ composite particles were obtained.

Furthermore, the conductive carbon-LiMnPO$_4$ composite particles were heated in nitrogen at 400° C. for 6 hours by using an oven to remove polyethylene glycol of an additive, and thereby, conductive carbon-LiMnPO$_4$ composite particles with voids were obtained.

In the same manner as in Example 1-12, measurement of the void ratio of the matrix of the composite particle, Raman spectrometry, measurement of a conductive carbon ratio, and measurement of the discharge capacity of the electrode formed were performed and evaluated in the same manner as in Example 1-1. The results of evaluations are shown in Table 1.

Comparative Example 1-1

A composite precursor was obtained in the same manner as in Example 1-1.

The composite precursor was heated in an argon atmosphere at 600° C. for 6 hours by using an oven to reduce the graphene oxide, and thereby, conductive carbon-LiMnPO$_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Comparative Example 1-2

A composite precursor was obtained in the same manner as in Example 1-1.

The composite precursor was heated in a hydrogen atmosphere at 600° C. for 6 hours by using an oven to reduce the graphene oxide, and thereby, conductive carbon-LiMnPO$_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Comparative Example 1-3

A sucrose (0.3 g), LiMnPO$_4$ particles prepared in Synthesis Example 2 (1 g), water (1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a composite precursor.

The composite precursor was heated in a hydrogen atmosphere at 600° C. for 6 hours by using an oven to reduce the graphene oxide, and thereby, conductive carbon-LiMnPO$_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Comparative Example 1-4

A graphene oxide powder prepared in Synthesis Example 1-3 (0.06 g), LiMnPO$_4$ particles prepared in Synthesis Example 2 (1 g), water (0.1 g) and seven zirconia balls (diameter 1 cm) were put in a 12 ml zirconia container and mixed at a rotational speed of 300 rpm for 6 hours by means of a planetary type ball mill (type P-5 manufactured by Fritsch Gmbh) to obtain a composite precursor.

The composite precursor was heated in an argon atmosphere at 600° C. for 6 hours by using an oven to reduce the graphene oxide, and thereby, conductive carbon-LiMnPO$_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

Comparative Example 1-5

A composite precursor was obtained in the same manner as in Example 1-1.

The composite precursor was heated in the air at 120° C. for 6 hours by using an oven to reduce the graphene oxide, and thereby, conductive carbon-LiMnPO$_4$ composite particles were obtained. The ratio of functionalization of the composite particle, the peak position and peak half bandwidth of a G band based on the conductive carbon, the carbon ratio in the composite, and the discharge capacity of the electrode formed from the composite particles were evaluated as with Example 1-1. The results of evaluations are shown in Table 1.

TABLE 1

| | Condition of Composite Formation | | | | | |
|---|---|---|---|---|---|---|
| | Carbon Raw Material | Active Material | Mixing Method | Reduction Method | Additive | Mixing Ratio (Weight Ratio) |
| Example 1-1 | Synthesis Example 1-1 oxidation degree of GO 0.53 | LiMnPO$_4$ | planetary ball mill | 200° C. air | — | active material:GO:water = 1:0.06:0.1 |
| Example 1-2 | Synthesis Example 1-1 oxidation degree of GO 0.53 | LiFePO$_4$ | planetary ball mill | 200° C. air | — | active material:GO:water = 1:0.06:0.1 |
| Example 1-3 | Synthesis Example 1-1 oxidation degree of GO 0.53 | LiMn$_2$O$_4$ (commercialized product) | planetary ball mill | 200° C. air | — | active material:GO:water = 1:0.06:0.1 |
| Example 1-4 | Synthesis Example 1-1 oxidation degree of GO 0.53 | LiMnPO$_4$ | planetary ball mill | benzyl alcohol | — | active material:GO:water = 1:0.06:0.1 |
| Example 1-5 | Synthesis Example 1-1 oxidation degree of GO 0.53 | LiMnPO$_4$ | planetary ball mill | sodium dithionite | — | active material:GO:water = 1:0.06:0.1 |
| Example 1-6 | Synthesis Example 1-1 oxidation degree of GO 0.53 | LiMnPO$_4$ | planetary ball mill | 200° C. air | — | active material:GO:water = 1:0.06:1 |
| Example 1-7 | Synthesis Example 1-1 oxidation degree of GO 0.53 | LiMnPO$_4$ | planetary ball mill | 200° C. air | — | active material:GO:water = 1:0.06:0 |
| Example 1-8 | Synthesis Example 1-2 oxidation degree of GO 0.45 | LiMnPO$_4$ | planetary ball mill | 200° C. air | — | active material:GO:water = 1:0.06:0.1 |
| Example 1-9 | Synthesis Example 1-4 oxidation degree of GO 0.41 | LiMnPO$_4$ | planetary ball mill | 200° C. air | — | active material:GO:water = 1:0.06:0.1 |
| Example 1-10 | Synthesis Example 1-4 oxidation degree of GO 0.41 | LiMnPO$_4$ | planetary ball mill | 160° C. air | — | active material:GO:water = 1:0.06:0.1 |
| Example 1-11 | Synthesis Example 1-4 oxidation degree of GO 0.41 | LiMnPO$_4$ | planetary ball mill | sodium dithionite | — | active material:GO:water = 1:0.06:0.1 |
| Example 1-12 | Synthesis Example 1-1 oxidation degree of GO 0.53 | LiMnPO$_4$ | planetary ball mill | sodium dithionite | PEG | active material:GO:PEG:water = 1:0.1:0.1:1 |

TABLE 1-continued

| | | | | | | |
|---|---|---|---|---|---|---|
| Example 1-13 | Synthesis Example 1-1 oxidation degree of GO 0.53 | LiMnPO$_4$ | planetary ball mill | sodium dithionite | NaHCO$_3$ | active material:GO:NaHCO$_3$:water = 1:0.1:0.1:1 |
| Example 1-14 | Synthesis Example 1-1 oxidation degree of GO 0.53 | LiMnPO$_4$ | planetary ball mill | sodium dithionite | PEG | active material:60:PEG:water = 1:0.1:0.5:1 |
| Comparative Example 1-1 | Synthesis Example 1-1 oxidation degree of GO 0.53 | LiMnPO$_4$ | planetary ball mill | 600° C. Ar atmosphere | — | active material:GO:water = 1:0.06:0.1 |
| Comparative Example 1-2 | Synthesis Example 1-1 oxidation degree of GO 0.53 | LiMnPO$_4$ | planetary ball mill | 600° C. hydrogen atmosphere | — | Active material:GO:water = 1:0.06:0.1 |
| Comparative Example 1-3 | sucrose | LiMnPO$_4$ | planetary ball mill | 600° C. hydrogen atmosphere | — | Active material:GO:water = 1:0.06:0 |
| Comparative Example 1-4 | Synthesis Example 1-3 oxidation degree of GO 0.18 | LiMnPO$_4$ | planetary ball mill | 600° C. Ar atmosphere | — | Active material:GO:water = 1:0.06:0.1 |
| Comparative Example 1-5 | Synthesis Example 1-1 oxidation degree of GO 0.53 | LiMnPO$_4$ | planetary ball mill | 120° C. air | — | Active material:GO:water = 1:0.06:0.1 |

| | Result of Analysis | | | | |
|---|---|---|---|---|---|
| | Ratio of Functionalization | Carbon Ratio in Composite | Void Ratio (%) | Discharge Capacity at 0.1 C (Ah/g) | Discharge Capacity at 3 C (Ah/g) |
| Example 1-1 | 0.58 | 0.03 | — | 149 | 124 |
| Example 1-2 | 0.58 | 0.03 | — | 156 | 148 |
| Example 1-3 | 0.57 | 0.03 | — | 130 | 125 |
| Example 1-4 | 0.45 | 0.03 | — | 152 | 115 |
| Example 1-5 | 0.36 | 0.03 | 3 | 153 | 106 |
| Example 1-6 | 0.58 | 0.03 | — | 120 | 85 |
| Example 1-7 | 0.59 | 0.03 | — | 125 | 96 |
| Example 1-8 | 0.46 | 0.03 | — | 150 | 116 |
| Example 1-9 | 0.25 | 0.03 | — | 152 | 130 |
| Example 1-10 | 0.16 | 0.03 | — | 153 | 124 |
| Example 1-11 | 0.17 | 0.03 | — | 154 | 129 |
| Example 1-12 | 0.25 | 0.032 | 32 | 152 | 125 |
| Example 1-13 | 0.26 | 0.031 | 24 | 151 | 118 |
| Example 1-14 | 0.26 | 0.033 | 67 | 109 | 51 |
| Comparative Example 1-1 | 0.11 | — | — | 85 | 46 |
| Comparative Example 1-2 | 0.08 | — | — | 98 | 36 |
| Comparative Example 1-3 | 0.09 | — | — | 101 | 52 |
| Comparative Example 1-4 | 0.08 | — | — | 92 | 45 |
| Comparative Example 1-5 | 1.03 | — | — | 54 | 12 |

<Positive Electrode Active Material/Graphene Composite Using Layered Oxide-Based Active Material Particle>

Example 2-1

Layered oxide-based active material (lithium-nickel-manganese-cobalt composite oxide (NMC) active material) particles (1 g), a graphene oxide synthesized according to Synthesis Example 1-2 (0.04 g), ethanol (0.05 g) and seven zirconia balls (diameter 1 cm) were put in a 12 ml zirconia container and mixed at a rotational speed of 100 rpm for 6 hours by means of a planetary type ball mill (type P-5 manufactured by Fritsch Gmbh) to obtain a composite particle precursor.

The composite particle precursor was heated in the air at 200° C. for 6 hours by using an oven to reduce the graphene oxide, and thereby, NMC active material particle-graphene composite particles were obtained. The morphology of the resulting composite particles was observed at a magnification of 3000 to 400000 times as it is, and consequently it was found that the aggregate of the graphene was not found between the particles and the active material was uniformly covered with the graphene.

The ratio of functionalization of graphene in the composite particle, and the mass ratio of carbon in the composite particle were measured according to Measurement Example 1 and Measurement Example 2 to obtain the results shown in Table 2. Further, Table 2 shows the results at the time when using the resulting composite particles, its discharge capacity was measured according to Measurement Example 3.

Example 2-2

Composite particles were synthesized and evaluated in the same manner as in Example 2-1 except for synthesizing the graphene oxide according to Synthesis Example 1-1. The results of evaluations are shown in Table 2. It was found from observation of the morphology of the resulting composite particles that the active material was uniformly covered with the graphene.

Example 2-3

NMC active material particles (1 g) and the graphene oxide (0.04 g) synthesized according to Synthesis Example 1-2 were dispersed in ethanol as a dispersion medium, mixed by a wet-jet mill (Star Burst (registered trademark) Mini manufactured by Sugino Machine Ltd.), and recovered with a spray dryer to obtain a composite precursor. The composite precursor was heated in the air at 200° C. for 6 hours by using an oven to reduce the graphene oxide, and thereby, NMC active material particle-graphene composite particles were obtained. The ratio of functionalization of graphene in the composite particle, and the mass ratio of carbon contained in the composite particle were measured according to Measurement Example 1 and Measurement Example 2 to obtain the results shown in Table 2. Further, Table 2 shows the results at the time when using the resulting composite, its discharge capacity was measured according to Measurement Example 3. The morphology of the resulting composite particles was observed at a magnification of 3000 to 400000 times as it is, and consequently it was found that the active material was covered in the form of a film with the graphene and the active material was uniformly covered with the graphene.

Example 2-4

In order to produce NCA active material particles in the form of a composition ratio of $LiNi_{0.8}Co_{0.15}Al_{0.05}O_2$, nitrate salts of Ni, Co and Al were dissolved to form a uniform solution in conformity to a stoichiometric proportion (Ni:Co:Al=0.8:0.15:0.05), and a pH of the solution was adjusted to 9.0 by ammonia water to coprecipitate a solid content, and the solid content was washed and dried at 150° C. for 6 hours. Thereafter, $Li_2CO_3$ was mixed in conformity to the molar ratio of $LiNi_{0.8}Co_{0.15}Al_{0.05}O_2$, and the resulting mixture was pulverized and heated at 750° C. for 12 hours to synthesize $LiNi_{0.8}Co_{0.15}Al_{0.05}O_2$.

A composite was synthesized and evaluated in the same manner as in Example 2-1 except for changing the active material to the resulting NCA active material particle. The results of evaluations are shown in Table 2. It was found from observation of the morphology of the resulting composite particles that the active material was uniformly covered with the graphene.

Example 2-5

A composite was synthesized and evaluated in the same manner as in Example 2-1 except for changing the active material to an LCO active material and changing the thermal reduction temperature to 150° C. The results of evaluations are shown in Table 2. It was found from observation of the morphology of the resulting composite particles that the active material was uniformly covered with the graphene.

Example 2-6

In order to produce a Li-rich active material in the form of a composition ratio of $0.5Li_2MnO_3$-$0.5Li(Ni_{1/3}Co_{1/3}Mn_{1/3})O_2$, acetate salts of Ni, Mn, Co and Li were weighed in the molar ratio in terms of the composition ratio, and together with an equimolar amount of citric acid, these acetate salts were dissolved in pure water to prepare a citric acid complex solution, and the solution was dried by spray drying to obtain a precursor. Then, the obtained precursor was temporarily heated at 400° C., pulverized and pelletized, and the pelletized precursor was formally heated at 900° C. in the air to obtain a Li-rich active material. A composite was synthesized and evaluated in the same manner as in Example 2-1 except for changing the active material to the resulting Li-rich active material particle. The results of evaluations are shown in Table 2. It was found from observation of the morphology of the resulting composite particles that the active material was uniformly covered with the graphene.

Comparative Examples 2-1 to 2-4

A composite of each of the active materials used in Examples 2-1 and 2-4 to 2-6/graphene was not formed, and discharge capacity of the active material was measured according to Measurement Example 3. The results of evaluations are shown in Table 2. It became apparent from a comparison with the case where the active material/graphene composite was formed that the discharge capacity at a high rate was small.

Comparative Example 2-5

The NMC active material particles (1 g), acetylene black (0.02 g), polyvinylidene fluoride (0.01 g) and seven zirconia balls (diameter 1 cm) were put in a 12 ml zirconia container and mixed at a rotational speed of 100 rpm for 6 hours by means of a planetary type ball mill (type P-5 manufactured by Fritsch Gmbh). It was found from observation of the morphology of the resulting active material that the active material was only partially covered with the acetylene black. The ratio of functionalization of carbon and the ratio of carbon in the obtained mixture were measured as with Example 2-1. The discharge capacity was measured according to Measurement Example 3. The results of evaluations are shown in Table 2.

Comparative Example 2-6

NMC active material particles (1 g), sucrose (2 g) and pure water (10 g) were kneaded in a mortar and the resulting mixture was vacuum dried in a state of heating at 90° C. Subsequently, the mixture was heated for 5 hours in a nitrogen flow at 700° C. to coat the NMC active material particles with carbon. The ratio of functionalization of graphene in the resulting NMC active material particle coated with carbon, and the ratio of carbon contained in the active material particle were measured according to Measurement Example 1 to obtain the results shown in Table 2. Further, Table 2 shows the results at the time when using the resulting active material particles, its discharge capacity was measured according to Discharge Capacity Measurement Example 1; however, the discharge capacity could not be measured since the NMC active material was reduced in coating the active material particle with carbon.

Comparative Example 2-7

Composite particles were synthesized and evaluated in the same manner as in Example 2-2 except for changing the thermal reduction temperature to 100° C. The results of evaluations are shown in Table 2.

Comparative Example 2-8

Composite particles were synthesized and evaluated in the same manner as in Example 1 except for synthesizing the graphene oxide according to Synthesis Example 1-5. The results of evaluations are shown in Table 2. It was found from observation of the morphology of the resulting composite particles that the active material was uniformly covered with the graphene.

TABLE 2

| | Condition of Composite Formation | | | | | Result of analysis | | | |
|---|---|---|---|---|---|---|---|---|---|
| | Carbon Raw Material | Active Material | Mixing Method | Reduction Method | Mixing Ratio (Weight Ratio) | Ratio of Functionalization | Carbon Ratio in Composite (%) | Discharge Capacity at 0.1 C (Ah/g) | Discharge Capacity at 3 C (Ah/g) |
| Example 2-1 | Graphene Oxide Synthesis Example 1-2 0.45 | NMC | planetary ball mill | 200° C. air | active material:GO:ethanol = 1:0.04:0.05 | 0.33 | 0.02 | 155 | 143 |
| Example 2-2 | Graphene Oxide Synthesis Example 1-1 0.53 | NMC | planetary ball mill | 200° C. air | active material:GO:ethanol = 1:0.04:0.05 | 0.59 | 0.02 | 154 | 141 |
| Example 2-3 | Graphene Oxide Synthesis Example 1-2 0.45 | NMC | wet-jet mill | 200° C. air | active material:GO = 1:0.04 | 0.33 | 0.02 | 155 | 144 |
| Example 2-4 | Graphene Oxide Synthesis Example 1-2 0.45 | NCA | planetary ball mill | 200° C. air | active material:GO:ethanol = 1:0.04:0.05 | 0.33 | 0.02 | 180 | 155 |
| Example 2-5 | Graphene Oxide Synthesis Example 1-2 0.45 | LCO | planetary ball mill | 150 air | active material:GO:ethanol = 1:0.04:0.05 | 0.33 | 0.02 | 144 | 111 |
| Example 2-6 | Graphene Oxide Synthesis Example 1-2 0.45 | Li-rich | planetary ball mill | 200° C. air | active material:GO:ethanol = 1:0.04:0.05 | 0.33 | 0.02 | 220 | 81 |
| Comparative Example 2-1 | — | NMC | — | — | — | — | — | 155 | 131 |
| Comparative Example 2-2 | — | NCA | — | — | — | — | — | 179 | 146 |
| Comparative Example 2-3 | — | LCO | — | — | — | — | — | 144 | 103 |
| Comparative Example 2-4 | — | Li-rich | — | — | — | — | — | 220 | 71 |
| Comparative Example 2-5 | acetylene black | NMC | planetary ball mill | — | active material:GO:ethanol = 1:0.04:0.05 | 0.02 | 0.02 | 156 | 135 |
| Comparative Example 2-6 | sucrose | NMC | mortar mixing | 700 nitrogen atmosphere | active material:GO:ethanol = 1:0.04:0.05 | 0.03 | 0.02 | 0 | 0 |
| Comparative Example 2-7 | Synthesis Example 1-1 oxidation degree of GO 0.53 | NMC | planetary ball mill | 100° C. air | active material:GO:ethanol = 1:0.04:0.05 | 1 | 0.02 | 141 | 113 |
| Comparative Example 2-8 | Synthesis Example 1-5 graphene oxide 0.64 | NMC | planetary ball mill | 200° C. air | active material:GO:ethanol = 1:0.04:0.05 | 0.81 | 0.02 | 154 | 132 |

The invention claimed is:

1. Positive electrode active material and graphene composite particles which comprise:
    positive electrode active material particles and
    a matrix containing partially functionalized graphene, wherein
    the partially functionalized graphene comprises graphene modified with a hydroxyl, carboxyl, ketone or epoxy group, and
    the composite particles have a ratio of functionalization that is not less than 0.15 and not more than 0.80, the ratio of functionalization being determined, based on measurements by X-ray photoelectron spectroscopic measurement of the composite particles, from the following equation:

Ratio of functionalization=[(peak area based on C—O single bond)+(peak area based on C═O double bond)+(peak area based on COO bond)]/ (peak area based on C—C, C═C and C—H bonds).

2. The positive electrode active material and graphene composite particles according to claim 1, wherein the composite particle ratio of functionalization is not less than 0.30 and not more than 0.80.

3. The positive electrode active material and graphene composite particles according to claim 1, wherein the composite particles have a mass ratio of carbon, in terms of percent, of less than 2% and not more than 20%.

4. The positive electrode active material and graphene composite particles according to claim 1, wherein the positive electrode active material is an olivine-based active material particle or a layered oxide active material particle.

5. The positive electrode active material and graphene composite particles according to claim 4, wherein the layered oxide active material particle is a Li-rich active material particle.

6. A positive electrode material for a lithium ion battery which contains the positive electrode active material and graphene composite particles according to claim 1.

7. The positive electrode active material and graphene composite particles according to claim 1, wherein upon being subjected to Raman spectroscopy the composite particles exhibit a Raman spectrometric G band peak position of 1600 cm$^{-1}$ or more and a peak half bandwidth is 90 cm$^{-1}$ or less.

8. The positive electrode active material and graphene composite particles according to claim 1, wherein the matrix has voids.

9. The positive electrode active material and graphene composite particles according to claim 8, wherein a void ratio of the matrix is not less than 10% and not more than 50%.

* * * * *